(12) United States Patent
Romainczyk

(10) Patent No.: US 10,926,757 B2
(45) Date of Patent: Feb. 23, 2021

(54) PARKING ASSIST SYSTEM FOR CARRYING OUT A PARKING MANEUVER IN AN AUTOMATED MANNER INTO A TRANSVERSE PARKING SPACE COMPRISING DETECTION OF A GROUND OBSTACLE DELIMITING THE TRANSVERSE PARKING SPACE TOWARDS THE REAR

(71) Applicant: Bayerische Motoren Werke Aktiengesellschaft, Munich (DE)

(72) Inventor: Christoph Romainczyk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 471 days.

(21) Appl. No.: 15/851,475

(22) Filed: Dec. 21, 2017

(65) Prior Publication Data
US 2018/0111610 A1 Apr. 26, 2018

Related U.S. Application Data

(63) Continuation of application No. PCT/EP2016/062965, filed on Jun. 8, 2016.

(30) Foreign Application Priority Data

Jun. 24, 2015 (DE) ...................... 10 2015 211 754.5

(51) Int. Cl.
*B60W 30/06* (2006.01)
*B62D 15/02* (2006.01)
(Continued)

(52) U.S. Cl.
CPC .......... *B60W 30/06* (2013.01); *B60W 30/143* (2013.01); *B60W 50/14* (2013.01);
(Continued)

(58) Field of Classification Search
CPC ..................................................... B60W 30/06
See application file for complete search history.

(56) References Cited

U.S. PATENT DOCUMENTS

| 2002/0084916 A1* | 7/2002 | Shimizu | ................. | B60Q 9/005 340/932.2 |
| 2005/0159855 A1* | 7/2005 | Sugiura | ................. | B60T 8/1755 701/1 |

(Continued)

FOREIGN PATENT DOCUMENTS

| CN | 103813953 A | 5/2014 |
| CN | 103946101 A | 7/2014 |

(Continued)

OTHER PUBLICATIONS

English-language Chinese Office Action issued in Chinese counterpart application No. 201680011630.6 dated Oct. 8, 2018 (Three (3) pages).

(Continued)

*Primary Examiner* — Truc M Do
(74) *Attorney, Agent, or Firm* — Crowell & Moring LLP

(57) ABSTRACT

A parking assist system that performs an automated parking maneuver of a motor vehicle into a transverse parking space transversely with respect to a roadway with automated longitudinal and transverse guidance along a parking trajectory. The system detects a signal characteristic of a drive torque of a drive engine that indicates impacting of one or more wheels against an obstacle. The system also detects that a vehicle position reached when the one or more wheels impact against the obstacle indicates that the obstacle is a delimiting ground obstacle which delimits the transverse parking space toward a rear.

17 Claims, 4 Drawing Sheets

(51) Int. Cl.
*B60W 30/14* (2006.01)
*B60W 50/14* (2020.01)

(52) U.S. Cl.
CPC ..... *B62D 15/0285* (2013.01); *B60W 2520/04* (2013.01); *B60W 2554/00* (2020.02)

(56) References Cited

U.S. PATENT DOCUMENTS

| | | | | |
|---|---|---|---|---|
| 2006/0287826 | A1* | 12/2006 | Shimizu | B60K 35/00 701/431 |
| 2007/0021881 | A1* | 1/2007 | Mori | B60Q 9/005 701/28 |
| 2007/0057816 | A1* | 3/2007 | Sakakibara | B62D 15/027 340/932.2 |
| 2007/0088474 | A1* | 4/2007 | Sugiura | B60R 1/00 701/36 |
| 2007/0129863 | A1* | 6/2007 | Hsu | G08G 1/168 701/36 |
| 2007/0146164 | A1* | 6/2007 | Schmid | G08G 1/168 340/932.2 |
| 2009/0174574 | A1* | 7/2009 | Endo | G01S 13/867 340/932.2 |
| 2009/0243888 | A1* | 10/2009 | Kawabata | B62D 15/028 340/932.2 |
| 2009/0278709 | A1* | 11/2009 | Endo | B62D 15/027 340/932.2 |
| 2010/0033348 | A1* | 2/2010 | Kawabata | B60R 1/00 340/932.2 |
| 2010/0049401 | A1* | 2/2010 | Watanabe | B60R 1/00 701/41 |
| 2010/0066825 | A1* | 3/2010 | Kuboyama | B62D 15/0275 348/118 |
| 2010/0228426 | A1* | 9/2010 | Suzuki | B62D 15/0275 701/31.4 |
| 2011/0199236 | A1* | 8/2011 | Hauber | B62D 15/027 340/932.2 |
| 2013/0010119 | A1* | 1/2013 | Mitsugi | B60R 1/00 348/148 |
| 2013/0116879 | A1* | 5/2013 | Huger | B62D 15/0285 701/23 |
| 2015/0138011 | A1* | 5/2015 | Hiramaki | G01S 17/931 342/118 |
| 2015/0353125 | A1* | 12/2015 | Tsubaki | B62D 1/286 701/42 |
| 2016/0159397 | A1* | 6/2016 | Baek | B60W 30/06 701/41 |
| 2016/0272244 | A1* | 9/2016 | Imai | G08G 1/166 |

FOREIGN PATENT DOCUMENTS

| | | |
|---|---|---|
| CN | 104118428 A | 10/2014 |
| DE | 10 2004 047 478 A1 | 4/2006 |
| DE | 10 2011 086 215 A | 5/2013 |
| DE | 10 2013 210 672 A1 | 12/2014 |
| DE | 10 2013 214 805 A1 | 1/2015 |
| EP | 0 849 144 A2 | 6/1998 |

OTHER PUBLICATIONS

PCT/EP2016/062965, International Search Report dated Sep. 15, 2016 (Two (2) pages).
German Search Report Issued in German counterpart application No. 10 2015 211 54.5 dated Mar. 17, 2016 (Five (5) pages).
Dirk Ahrens, "Parkassistent mit Laengs- und Querfuehrung", 5th Conference Driver Assistance of the TU, Munich, 2012, 10 total pages.

\* cited by examiner

PARKING ASSIST SYSTEM FOR CARRYING OUT A PARKING MANEUVER IN AN AUTOMATED MANNER INTO A TRANSVERSE PARKING SPACE COMPRISING DETECTION OF A GROUND OBSTACLE DELIMITING THE TRANSVERSE PARKING SPACE TOWARDS THE REAR

CROSS REFERENCE TO RELATED APPLICATIONS

This application is a continuation of PCT International Application No. PCT/EP2016/062965, filed Jun. 8, 2016, which claims priority under 35 U.S.C. § 119 from German Patent Application No. 10 2015 211 754.5, filed Jun. 24, 2015, the entire disclosures of which are herein expressly incorporated by reference.

BACKGROUND AND SUMMARY OF THE INVENTION

The invention relates to parking assist systems having automated longitudinal and transverse guidance for motor vehicles, in particular for passenger cars.

In parking assist systems with merely automated transverse guidance, the steering of the motor vehicle is assumed by the system during the parking maneuver. The longitudinal guidance has to be assumed by the driver himself by means of corresponding acceleration and braking. In the case of parking assist systems with automated transverse guidance and automated longitudinal guidance, the task of longitudinal guidance is also assumed partially or completely by the parking assist system depending on the degree of automation of the longitudinal guidance. In the case of a parking assist system with fully automated transverse and longitudinal guidance, for example the steering, the brake, the vehicle drive and the direction of travel (forward travel or reverse travel) are controlled by the parking assist system. In the case of such parking assist systems, the driver has the option, for example, of allowing the motor vehicle to be parked and optionally removed from the parking space automatically by activating an operator control element, for example a push-button key.

An exemplary parking assist system with automatic transverse guidance and automatic longitudinal guidance is described in the document "Parking Assistant with Longitudinal and Transverse Guidance", Dirk Ahrens, 5th conference Driver Assistance of the TU Munich, 2012. Parking assist systems with automatic transverse and longitudinal guidance are also described in documents DE 10 2013 214 805 A1 and DE 10 2013 210 672 A1.

Known parking assist systems typically support reverse parking along the roadway into a longitudinal parking space located parallel to the roadway, wherein the vehicle is parked in a reverse direction with automated transverse guidance and, if appropriate, automated longitudinal guidance in one or more movements along a calculated parking trajectory into the longitudinal parking space.

Relatively recent parking assist systems partially also additionally support reverse parking into a transverse parking space transversely with respect to the roadway, wherein the vehicle is preferably parked in reverse with automatic transverse guidance and, if appropriate, automatic longitudinal guidance in one or more movements along a calculated parking trajectory into the transverse parking space. Transverse parking spaces can also be understood to be so-called angled parking spaces which are not oriented orthogonally with respect to the roadway.

Such parking assist systems for transverse parking spaces support at least transverse parking spaces which are limited by a lateral object on the one side of the transverse parking space or another lateral object on the other side of the transverse parking space. The objects which delimit the parking space are, for example, parked motor vehicles which have been parked transversely with respect to the roadway. Such an object which delimits the parking space laterally can, however, also be an object which is not a vehicle such as, for example, a pillar, a bollard, a fence or a low ground structure such as a planter box. To the rear, such transverse parking spaces are frequently bounded by a ground obstacle, for example by a curbstone or an elongate parking stop (for example a tube) which is attached to the ground and runs parallel to the ground.

For example, in such parking assist systems for parking in transverse parking spaces when manually traveling past motor vehicles which are parked, for example, transversely with respect to the road, a transverse parking space is measured automatically between the lateral objects which delimit the transverse parking space (for example vehicles parked in the transverse direction) by means of an ultrasonic sensor system. In this context, the contour of the delimiting objects which are oriented in the direction of the roadway is typically determined. Owing to the limited sensor range (e.g. 4 m) it is usually not possible to detect the rear boundary (e.g. a curbstone) of the transverse parking space.

Before the parking maneuver is carried out, on the basis of the measurement of the parking space, a parking trajectory with an end-of-parking position is planned on which the motor vehicle is parked in reverse with automatic transverse guidance and, if appropriate, automatic longitudinal guidance in one or more movements into the longitudinal parking space, in order then to end the parking maneuver in the end-of-parking position.

Since the ground obstacle (e.g. the curbstone) which delimits the parking space toward the rear usually cannot be seen by the ultrasonic sensor system when the parking space is measured, the end-of-parking position may be positioned so far to the rear when the position of the ground obstacle which delimits the parking space to the rear is not known, that in the case of a reverse parking maneuver the vehicle would have to drive with its rear wheels onto the ground obstacle, e.g. onto the curbstone, in order to reach the end-of-parking position.

For example, after the parking space has been measured it is possible to define such an end-of-parking position at which the extent of the vehicle in question in the direction of the roadway in the end-of-parking position is aligned with the extent of one object or both objects which delimit the parking space laterally, in the direction of the roadway. For example, the extent of the vehicle in question in the direction of the roadway in the end-of-parking position is aligned with the extent of that object of the two objects which laterally delimit the parking space, in the direction of the roadway, which extends less far in the direction of the roadway. That is to say, the parking assist system is aligned with the object whose boundary with the roadway is offset further to the rear and correspondingly projects less in the direction of the roadway. If the object which extends less far in the direction of the roadway and with which the parking assist system aligns itself for the longitudinal extent in the end-of-parking position, about an object which is relatively short (e.g. a relatively short vehicle) compared to the parking vehicle, the situation may easily arise in which in order to reach the end-of-parking position the parking vehicle would drive with the rear wheels up onto the ground obstacle (e.g. onto the curbstone) which delimits the parking space to the rear, in order to align itself flush with the front of the object.

An object of the invention is to specify a parking assist system or a corresponding parking method with which the wheels are prevented from driving up onto the ground obstacle which delimits the parking space to the rear.

This object may be achieved by means of the features of the independent patent claims. Advantageous embodiments are described in the dependent claims. It is denoted that additional features of a patent claim which is dependent on an independent patent claim can form, without the features of the independent patent claim or only in combination with a subset of the features of the independent patent claim, a separate invention which is independent of the combination of all the features of the independent patent claim which can be made a subject matter of an independent claim of a divisional application or of a subsequent application. This applies in the same way to technical teaching which is described in the description and which can form an invention which is independent of the features of the independent patent claims.

A first aspect of the invention relates to a parking assist system for carrying out an automated parking maneuver of a motor vehicle into a transverse parking space transversely with respect to the roadway with automated longitudinal and transverse guidance along a parking trajectory.

The parking assist system is configured to define an end-of-parking position for the motor vehicle, to be assumed at the end of the parking maneuver. For example, the transverse parking space is delimited by a lateral object (e.g. a first vehicle which parks transversely with respect to the roadway) on the one side of the transverse parking space and/or by another lateral object (e.g. a second vehicle which parks transversely with respect to the roadway) on the other side of the transverse parking space. In this case, the parking assist system is, for example, configured to determine, before the parking maneuver is carried out, the extent of the one object in the direction of the roadway and/or of the extent of the other object in the direction of the roadway by means of a sensor system, and to define an end-of-parking position on the basis thereof.

The end-of-parking position is defined, in particular, before the parking maneuver is carried out; however, it can optionally be provided that an initial end-of-parking position is adapted during the end-of-parking maneuver on the basis of additional ultrasonic information which is acquired during the parking maneuver.

The parking assist system according to the invention is configured to detect, while the parking maneuver is being carried out, that a signal which is characteristic of the drive torque of the drive engine fulfills a first criterion, the fulfillment of which indicates impacting of one or more wheels against an obstacle. For example, the parking assist system comprises a cruise controller for adjusting the speed of the motor vehicle to a setpoint speed which is predefined by the parking assist system, wherein the cruise controller comprises an integrator for integrating a control error, and the signal which is characteristic of the drive torque of the drive engine is a signal at the output of the integrator or a signal which is dependent thereon. Such a signal is described, for example, in document DE 10 2013 210 672 A1 (see the signal there with the reference symbol int).

The signal which is characteristic of the drive torque of the drive engine fulfills, for example, the first criterion, which indicates impacting of the wheels against an obstacle, if the signal is greater than or greater than or equal to a specific threshold value.

In this context it is preferably also checked whether the actual speed of the vehicle is essentially zero, for example whether the actual speed is less than a stationary state entry speed Vstat,ent (e.g. Vstat,ent=0.2 km/h) for which a very small value is selected. According to this condition, the fulfillment of the first criterion preferably indicates that the tires impact against an obstacle. For example, it is firstly detected that the actual speed is essentially zero, and only in reaction to that it is checked whether the signal which is characteristic of the drive torque of the drive engine fulfills the first criterion.

The parking assist system according to the invention may be configured to detect that the vehicle position which is reached when one or more wheels impact against the obstacle fulfills, in comparison with the end-of-parking position, a second criterion, the fulfillment of which indicates that the obstacle is the ground obstacle (e.g. the curbstone) which delimits the transverse parking space toward the rear. For example, the vehicle position which is reached when one or more tires impact against the obstacle fulfills the second criterion if a degree of difference between the vehicle position which is reached when one or more wheels impact against the obstacle and the end-of-parking position is smaller than or smaller than or equal to a threshold value. For example, the second criterion is fulfilled if the distance in the assumed longitudinal direction of the parking space between the vehicle position when the tires impact against the obstacle and the envisaged end-of-parking position is less than a preferably applicable value (e.g. 50 cm); i.e. the vehicle is then located less than e.g. 50 cm from the end-of-parking position. If the vehicle position fulfills the second criterion and the vehicle position is therefore near to the end-of-parking position it is to be assumed that the obstacle is the ground obstacle which delimits the parking space to the rear (e.g. curbstone or tire stopper).

If the two criteria are fulfilled, it can be assumed that the tires are already in contact with the ground obstacle (e.g. curbstone) which delimits the parking space to the rear. According to the invention, in this case the vehicle can be prevented from dipping further into the parking space and driving over the ground obstacle which delimits the parking space to the rear and the parking maneuver is ended before the previously determined end-of-parking position is reached.

The parking assist system according to the invention therefore permits, through evaluation of the signal which is characteristic of the drive torque and of the vehicle position, the ground obstacle which delimits the transverse parking space to the rear to be detected so that rolling over the ground obstacle which delimits the parking space can be avoided.

The parking assist system preferably comprises an, in particular visual or acoustic, output device for signaling a successful conclusion of a parking maneuver to the driver. For example, a successful conclusion of the parking maneuver is displayed on a screen in the vehicle cockpit, for example by means of text information (e.g. "parking maneuver concluded") and/or by means of a graphic symbol (e.g. a parking symbol with a hook). According to the invention, if both criteria are fulfilled, a successful conclusion of the parking maneuver is signaled to the user when the parking maneuver ends despite the end-of-parking position defined at the start (e.g. oriented with the front of one or two delimiting objects) not being reached. This means that despite the previously defined end-of-parking position not being reached the driver assumes that the parking maneuver has been successfully concluded. In the event of premature ending of the parking maneuver, the driver is preferably not unsettled by a fault message from the parking assist system.

According to one embodiment, if both criteria are fulfilled, the parking assist system is configured to end the parking maneuver at the vehicle position which is reached when one or more wheels impact against the obstacle. After the deactivation of the drive torque in this vehicle position it may be the case that the vehicle still rebounds a few centimeters from this position in the direction of the roadway.

According to an alternative embodiment to this, if both criteria are fulfilled, the direction of travel is actively reversed (for example a forward gear speed is engaged in the case of a reverse parking maneuver) and the motor vehicle is then moved in an automated fashion a certain distance (e.g. 5 cm to 50 cm) counter to the previous direction of travel (i.e. moved toward the roadway), before the parking maneuver is then ended. In comparison with the other embodiment, this has the advantage that in the end position which is then finally assumed the tires are spaced apart further from the ground obstacle (e.g. curbstone) which delimits the parking space to the rear and the vehicle projects less or not at all beyond the ground obstacle.

A degree of difference (for example the distance between the two positions in the assumed longitudinal direction of the parking space or the distance between the two positions in the direction of the driving tube) between the vehicle position which is reached when one or more tires impact against the obstacle and the end-of-parking position is preferably calculated and this degree of difference is evaluated, in particular by means of a threshold value comparison as described above.

However, it is not absolutely necessary for such a degree of difference to be calculated. For example, in the case of dipping into the parking space it is detected at some point that the vehicle position has exceeded a specific longitudinal position in respect of the end-of-parking position, for example only fewer than 50 cm away from the end-of-parking position. If the vehicle then continues to move in the previous direction of travel, the second criterion would be immediately fulfilled when the tires impact against the ground obstacle, without the degree of difference for the specific vehicle position having to be calculated. If the vehicle then actually impacts against the obstacle at some point, which is detected by fulfillment of the first criterion, the second criterion is then in any case already fulfilled with respect to the current vehicle position.

The vehicle position and the end-of-parking position are preferably based on a reference point of the vehicle, for example to the center of the rear axle of the vehicle. This means that when a vehicle position is present the center of the rear axle is located at the respective vehicle position; in the end-of-parking position the center of the rear axle is therefore at the end-of-parking position.

A second aspect of the invention relates to a method for carrying out an automated parking maneuver of a motor vehicle into a transverse parking space transversely with respect to the roadway with automated longitudinal and transverse guidance along a parking trajectory.

According to the method, an end-of-parking position for the motor vehicle, to be assumed at the end of the parking maneuver, is defined.

While the parking maneuver is being carried out, it is detected that a signal which is characteristic of the drive torque of the drive engine fulfills a first criterion, the fulfillment of which indicates impacting of one or more wheels against an obstacle. Corresponding checking for the fulfillment of the criterion does not take place, for example, until after it has been detected that the actual speed of the vehicle is essentially zero.

It is detected that the vehicle position which is reached when one or more wheels impact against the obstacle fulfills, in comparison with the end-of-parking position, a second criterion, the fulfillment of which indicates that the obstacle is the ground obstacle which delimits the transverse parking space toward the rear.

If both criteria are fulfilled, the parking maneuver is ended before the end-of-parking position is reached.

The above embodiments of the parking assist system according to the invention according to the first aspect of the invention apply correspondingly also to the method according to the invention according to the second aspect of the invention. At this point, advantageous exemplary embodiments of the method according to the invention which are not explicitly described in the patent claims correspond to the advantageous exemplary embodiments of the parking assist system according to the invention which are described above or described in the patent claims.

Other objects, advantages and novel features of the present invention will become apparent from the following detailed description of one or more preferred embodiments when considered in conjunction with the accompanying drawings.

BRIEF DESCRIPTION OF THE DRAWINGS

The invention will be described below with reference to the appended drawings and on the basis of an exemplary embodiment. In said drawings.

DETAILED DESCRIPTION OF THE DRAWINGS

Figure 1:
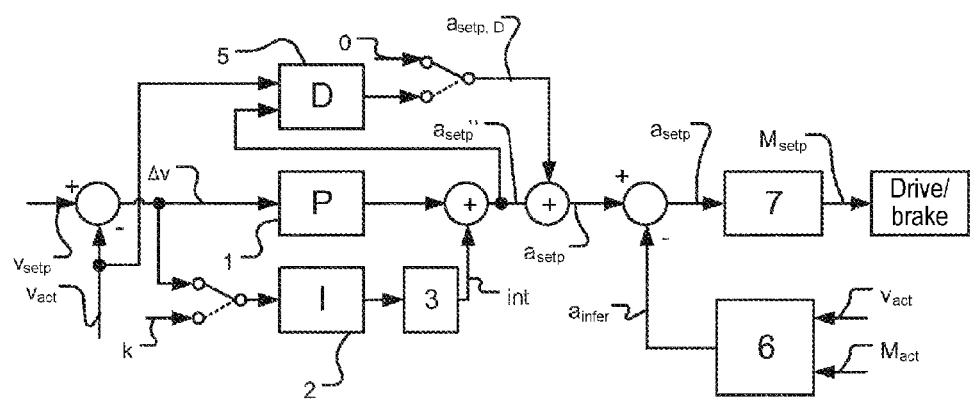
FIG. 1 shows a cruise controller, known from the prior art, of a parking assist system.

FIG. 1 shows in a schematic fashion a cruise controller, known from document DE 10 2013 210 672 A1, for longitudinally guiding a parking assist system. The disclosure content of this document is herewith incorporated into the disclosure content of this document by reference.

The cruise controller comprises a P component 1 which receives a control error where $\Delta v = v_{setp} - v_{act}$ between a vehicle setpoint speed $v_{setp}$ which is predefined by the parking assist system and a vehicle actual speed $v_{act}$ and generates an output signal which is proportional to the control error $\Delta v$. The vehicle setpoint speed $v_{setp}$ and the vehicle actual speed $v_{act}$ are in this exemplary embodiment variables with a value range which is greater than or equal to zero. The direction of movement (forward direction or reverse direction) results from the selection of gear speed (forward gear speed or reverse gear speed).

In addition, the cruise controller comprises an I component 2 which can preferably be switched between two states. In a first state, which corresponds to the switch position denoted by the continuous line in FIG. 1 at the input of the I component 2, the control error $\Delta v = v_{setp} - v_{act}$ is received by the I component 2 and integrated, and the manipulated variable of the cruise controller is determined on the basis of the integral value int which is generated by integration of the control error Δv. The I component 1 is activated in this stage, i.e. the I component determines an integral value int by integration of the control error Δv, wherein the manipulated variable of the control circuit depends on the integral value int. The integral value int is limited here by a limiter 3 between 0, as a lower limit, and a maximum value $int_{max}$ as an upper limit. The intregal value int and the output signal of the P component 1 are added.

In addition to the first state, a second state is preferably provided, which second state corresponds to the switch position denoted by a dashed line in FIG. 1 at the input of the I component 2; in this second state the control error Δv is not integrated. Instead a constant value k to be integrated where k<0 is applied to the I component, said constant value k being independent of the control error Δv, so that the integral value int remains zero if the integral value int was already zero, or is reduced in a ramp shape to zero if the integral value int was previously greater than zero. The gradient of the ramp depends on the value k. For example, in the second state, instead of the current control error Δv, a value k=−20 m/s, which is independent of the control error, is applied to the I component 2. It is to be noted that in order to simplify the cruise controller the capability of switching the I component and the second state could be dispensed with.

Adding the output signal of the P component 1 and the integral value int of the I component 2 results in a setpoint acceleration $a_{setp}"$, in which the output signal of an optional D component 5 is not yet taken into account.

The optional D component 5 is an activatable D component 5 which, where necessary, is activated in order to decelerate the vehicle after an obstacle near to the ground has been overcome (for this purpose the switch at the output of the D component 5 is switched over into the switch position shown by dashed lines). The setpoint acceleration $a_{setp}'$ additionally also takes into account the output signal of the optional D component. In order to simplify the cruise controller, the D component could be dispensed with.

In addition, an interference variable estimator 6 is provided which calculates an acceleration $a_{infer}$ as an interference variable as a function of the current actual speed $V_{act}$ and the current torque $M_{act}$. In the interference variable estimator 6, a current acceleration is determined from the current actual speed $v_{act}$ by differentiation, and this current acceleration is compared with the current torque $M_{act}$ which is converted into an acceleration. From this comparison, the interference variable $a_{infer}$ is then calculated by means of a suitable transmission behavior. If the current acceleration and the current torque $M_{act}$ match, the value of the interference variable $a_{infer}$ is equal to zero. The setpoint acceleration $a_{setp}$ is calculated by subtracting the interference variable $a_{infer}$ from the setpoint acceleration $a_{setp}'$. It is to be noted that it is not absolutely necessary to use an interference variable estimator 6 for the exemplary embodiment in FIG. 1.

A setpoint torque $M_{setp}$ is calculated from the setpoint acceleration $a_{setp}$ in block 7. The setpoint torque $M_{setp}$ is then divided into a setpoint torque for the drive and a setpoint torque for the brake (not illustrated).

The parking assist system is configured, in the event of impediment by a ground obstacle, to activate the I component 2 so that by virtue of the integration of the control error Δv, drive torque is brought about in the direction of travel which is so high that the motor vehicle can overcome the ground obstacle depending on the height of the ground obstacle. If the I component 2 is activated, the switch position which is illustrated by a continuous line is assumed at the start of the I component so that the control error Δv is received from the I component 2 and integrated. The resulting integral value int of the I component 2 can become significantly larger than the output value of the P component 1.

The switch position at the input of the I component 2 preferably depends on the actual speed $v_{act}$ and the state of the cruise controller.

The I component is activated and integrates the control error Δv (i.e. the latter is then placed in the first state which corresponds to the switch position indicated by a continuous line in FIG. 1 at the input of the I component 2) if
1. the actual speed $v_{act}$ is lower than the stationary state entry speed $v_{stat,entry}$ (for example $v_{stat,entry}$=0.2 km/h), which is selected to be very small, and
2. the cruise controller is in an activation state in which the vehicle usually travels forward or in reverse.

Figure 2:
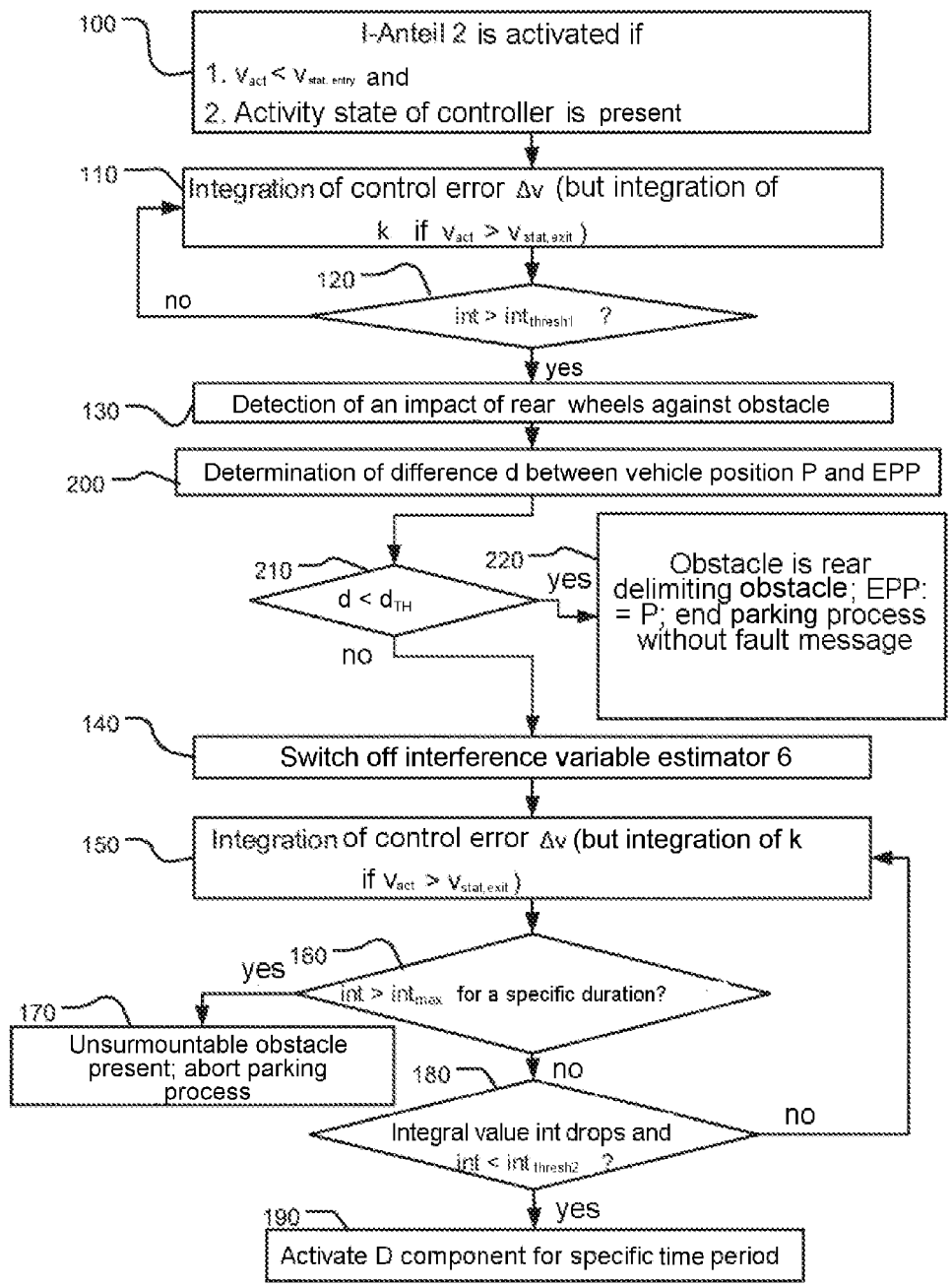
FIG. 2 shows an exemplary flowchart of a parking assist system according to the invention.

This corresponds to the step 100 in the flowchart in FIG. 2.

If the actuation of the I component 2 does not take place, the I component 2 carries out integration of the constant variable k<0, so that the integral value int is adjusted to zero or is held at zero.

The cumulative presence of the two conditions 1. and 2. indicates that a stationary state of the vehicle which is unintended by the parking assist system is present.

In the case of an active I component 2, the integral value int increases starting from zero by integration of the control error Δv (see step 110 in FIG. 2). The integration of the control error Δv is, however, aborted and instead the negative value k is integrated when the blocked vehicle starts to move again and $v > v_{stat,exit}$ (with, for example, $v_{stat,exit}$=0.3 km/h). As a result, the integral value int is reduced in a ramp shape.

If the integral value int has exceeded a specific threshold value $int_{thresh1}$ (see interrogation 120) it is detected from this that the wheels impact against an obstacle which blocks the movement of the vehicle (see step 130).

In step 200, the difference d of the current vehicle position from the end-of-parking position EPP is determined; the deviation d is, for example, the distance in the assumed longitudinal direction of the transverse parking space between the current vehicle position and the end-of-parking position EPP.

In step 210, it is checked whether the current vehicle position P is within a predefined tolerance band directly before the end-of-parking position EPP, i.e. whether the deviation d of the current vehicle position P from the end-of-parking position EPP is less than a threshold value dTH which marks the width of the tolerance band.

If this is the case it is assumed that the obstacle is the ground obstacle (e.g. curbstone) which delimits the transverse parking space to the rear, and the parking maneuver is ended (see step 220). For this purpose, the end-of-parking position EPP is set to the current vehicle position P, i.e. EPP: =P. The parking assist system then assumes that the vehicle has reached, with the current vehicle position P, the newly set end-of-parking position EPP=P and automatically ends the parking maneuver. A successful conclusion of the parking maneuver is displayed on the screen in the vehicle cockpit, for example by means of text information (e.g. "parking maneuver concluded") and/or by means of a graphic symbol (e.g. a parking symbol with a hook).

If the difference d is greater than or equal to the threshold value $d_{TH}$, the parking maneuver is not ended.

Firstly, the interference variable estimator 6 is switched off in such a way that it then keeps its output value $a_{infer}$ constant during the switched-off state (see step 140).

If the vehicle speed $v_{act}$ does not exceed the stationary state exit speed $v_{stat,exit}$, the control error Δv continues to be integrated (see step 150) and the integral value int increases further. However, if the vehicle speed $v_{act}$ is greater than $v_{stat,exit}$, the constant negative value k is integrated by means of the I component 2, so that the integral value int is reduced in a ramp shape.

If the integral value int increases to such an extent that the integral value int corresponds to the maximum possible integral value $int_{max}$ for a specific uninterrupted duration (for example 3 s) (see interrogation 160), the presence of a ground obstacle which cannot be overcome is detected from this and the automatic parking process is aborted (see step 170). A corresponding abort message in a visual or acoustic form is output to the driver, for example on the screen in the vehicle cockpit If, after the ground obstacle has already been previously detected (see step 130), the integral value int drops again after the obstacle has been overcome and falls below a threshold value $int_{thresh2}$ (see interrogation 180), the D component 5 is activated for a specific time period (for example for 2 s after the overcoming of the obstacle) (see step 190) in order to decelerate the vehicle quickly and therefore avoid a collision with other vehicles or other objects.

Figure 3:
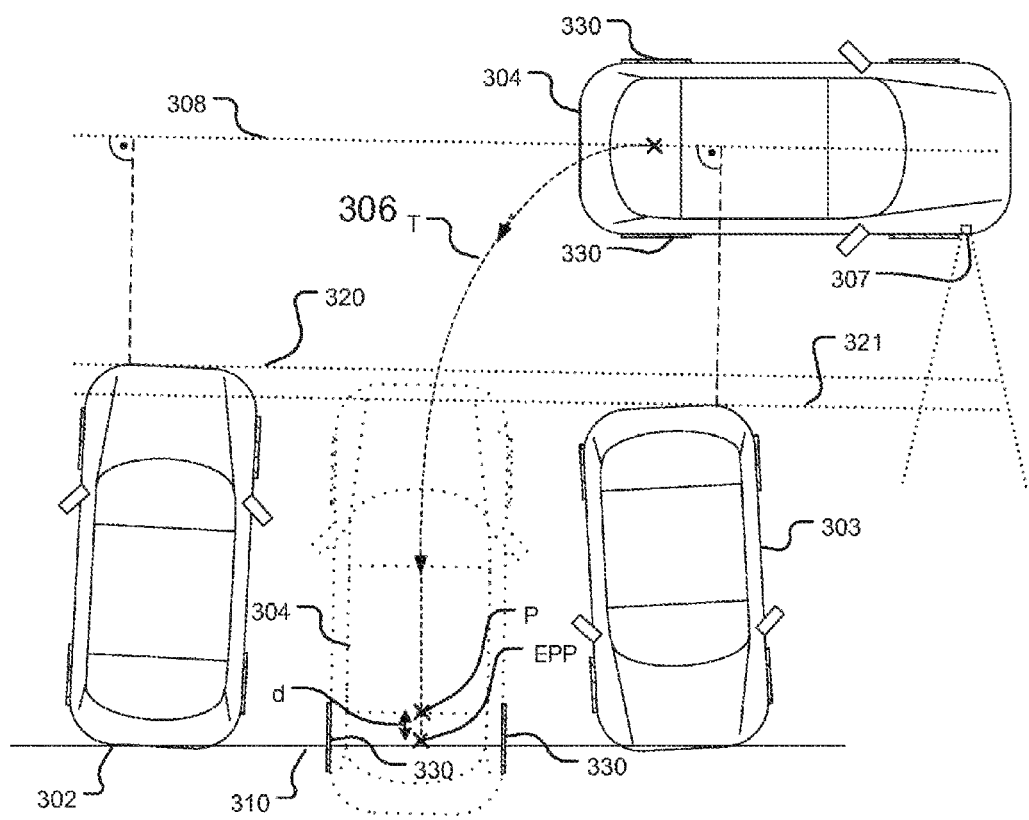
FIG. 3 shows a parking situation in a transverse parking space.

FIG. 3 shows a parking situation in a transverse parking space 301 before the start of the parking process with an exemplary parking assist system according to the invention with automated longitudinal and transverse guidance.

Firstly, the parking assist system is activated by actuation of a parking pushbutton key by the driver. After the parking assist system has been switched on, the current status of the search for a parking space is displayed on a screen of the instrument combination in the vehicle cockpit.

The lateral parking area is continuously measured by means of a lateral ultrasonic sensor 307 as the vehicle slowly drives past the motor vehicles 302, 303 which are parked transversely with respect to the roadway 306. Herein, as the vehicle drives past, the respective distance between the ultrasonic sensor 307 and the closest object in the lateral direction is determined at the individual vehicle positions.

On the basis of the distance values measured by ultrasound a map of the surroundings is generated in which the boundary contours of the objects in the direction of the roadway 306 are entered. The range of the ultrasonic sensor 307 is typically limited to approximately 4 m; a precise measurement of the rearmost area of the parking space 301, in particular the detection of a curbstone 310 which delimits the parking space to the rear is therefore frequently not possible.

As long as the vehicle 304 has not yet come to a standstill, the measurement is continuously carried on as the vehicle drives past and the map of the surroundings is continuously adapted to the new measured values.

If the transverse parking space 301 has been detected as a suitable transverse parking space, a pictogram of a detected transverse parking space is displayed on the screen in the vehicle cockpit. In order to detect a suitable transverse parking space, it is checked, for example, whether the parking space has a width between two objects which corresponds to the width of the actual vehicle plus at least 0.7 m, and within the scope of the measurement of the parking space no object is detected in the parking space transversely with respect to the roadway in the range of the sensor system (e.g. approximately 4 m).

After the transverse parking space 301 has been detected as a suitable transverse parking space and the vehicle has come to a standstill, a parking trajectory T is calculated with a planned end-of-parking position EPP on which the actual vehicle 304 is to park in the rearward direction in one more moves with automatic transverse guidance into the transverse parking space 301. The parking trajectory T and the end-of-parking position EPP are based on a specific reference point of the vehicle 304, for example on the center of the rear axle of the actual motor vehicle 304.

The end-of-parking position EPP preferably depends on the extent of the vehicle 302 and/or the extent of the vehicle 303. The extent of the motor vehicle 302 in the direction of the roadway 306 is marked in FIG. 3 by the line 320; the extent of the motor vehicle 303 in the direction of the roadway 306 is marked in FIG. 1 by the line 321.

For example, a parking trajectory T with a planned end-of-parking position EPP is calculated, wherein in the end-of-parking position EPP the extent of the vehicle 304 is aligned in the direction of the roadway with half the offset of the extent of the two objects 302, 303. A corresponding exemplary single-movement parking trajectory with suitable end-of-parking position EPP is illustrated in FIG. 1. The resulting contour of the actual vehicle 304 in the planned end-of-parking position EPP is illustrated by dotted lines in FIG. 3. The parking assist system can optionally be aligned in such a way that when the vehicle dips into the parking space, easy corrections relating to the end-of-parking position EPP can still be performed as a function of the orientation of the two objects 302, 303 which can then be sensed better by sensor.

After the determination of the parking trajectory T, the parking maneuver can be triggered by activating a parking pushbutton key in the vehicle cockpit. During the parking process the parking assist system assumes the steering, the acceleration and braking and changes the gear speeds where necessary.

In the situation illustrated in FIG. 3, the rear wheels 330 would already impact against the curbstone 310 before the end-of-parking position EPP is reached, so that in order to reach the illustrated end-of-parking position EPP the rear wheels 330 would have to drive up onto the curbstone 310. When the position P is reached (the center of the rear axle is then at the position P) one or both rear wheels 330 impact against the curbstone 310 and the vehicle is braked to a stationary state. The impacting is detected by evaluating the integral value int, as has already been explained in relation to FIG. 2 (see the interrogation 120 in FIG. 2).

The difference d between the vehicle position P and the previously calculated end-of-parking position EPP is calculated (see step 200). The difference d results, for example, from the distance between the two positions P and EPP in the assumed longitudinal direction of the parking space (i.e. a transverse difference which is orthogonal with respect to the assumed longitudinal direction of the parking space 301 is not taken into account, for example, in the difference).

In the situation illustrated in FIG. 3, it is detected in the integration 210 from FIG. 2 that the difference between the vehicle position P and the previously calculated end-of-parking position EPP is smaller than the threshold value $d_{TH}$ (for example $d_{TH}$=50 cm).

The parking assist system concludes from this that the vehicle 304 is impacting against the rear curbstone 10 and sets the end-of-parking position to the position P which has been reached, i.e. EPP: =P. Since the target position of the parking maneuver has therefore already been reached at the position P, the parking maneuver is ended at the position P and the parking lock is engaged without the vehicle driving onto the curbstone 310. After the driving torque has been deactivated in the position P, the vehicle 304 in practice still rebounds several centimeters starting from the parked position P in the direction of the roadway 306 so that in the final parked position there is typically a small distance between the rear wheels 320 and the curbstone 310.

A successful conclusion of the parking maneuver is signaled to the driver on the screen in the vehicle cockpit.

Figure 4:
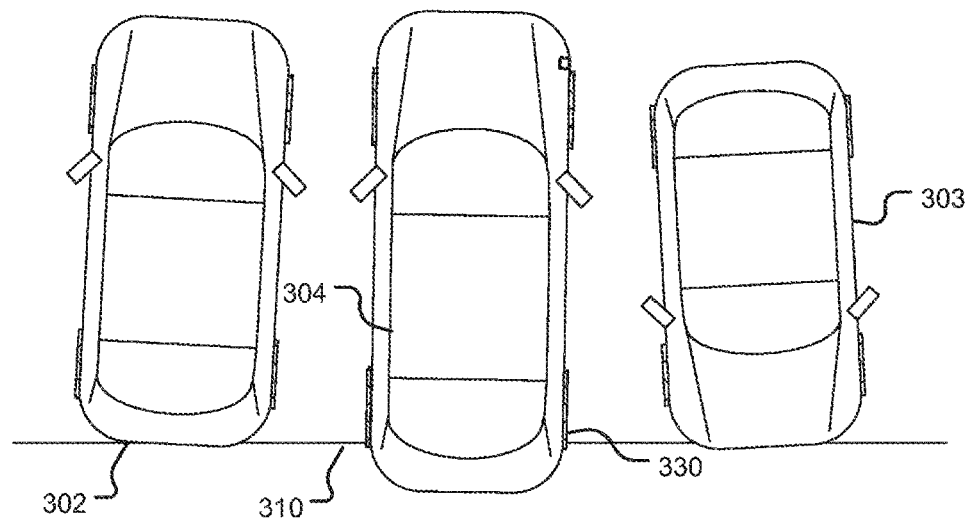
FIG. 4 shows a resulting parked position after the parking maneuver is ended.

The resulting parked position of the vehicle after the ending of the parking maneuver is illustrated in FIG. 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A parking assist system configured to perform an automated parking maneuver of a motor vehicle into a transverse parking space transversely with respect to a roadway with automated longitudinal and transverse guidance along a parking trajectory, comprising:
   a controller configured to:
      define an end-of-parking position for the motor vehicle corresponding to an assumed end of the parking maneuver,
      detect, while the parking maneuver is being performed, that a signal which is characteristic of a drive torque of a drive engine fulfills a first criterion, the fulfillment of which indicates impacting of one or more wheels against an obstacle,
      detect that a vehicle position reached when the one or more wheels impact against the obstacle fulfills, in comparison with the end-of-parking position, a second criterion, the fulfillment of which indicates that the obstacle is a delimiting ground obstacle which delimits the transverse parking space toward a rear, and
      end the parking maneuver, before the defined end-of-parking position is reached, as a result of both the first and second criteria being fulfilled.

2. The parking assist system as claimed in claim 1, further comprising:
   an output device configured to signal a successful conclusion of the parking maneuver to the driver, in response to the first and second criteria being fulfilled, when the parking maneuver ends.

3. The parking assist system as claimed in claim 1, wherein the vehicle position, which is reached in comparison with the end-of-parking position when the one or more wheels impact against the obstacle, fulfills the second criterion when a degree of difference between the vehicle position which is reached when one or more wheels impact against the obstacle and the end-of-parking position is smaller than or smaller than or equal to a threshold value.

4. The parking assist system as claimed in claim 2, wherein the vehicle position, which is reached in comparison with the end-of-parking position when the one or more wheels impact against the obstacle, fulfills the second criterion when a degree of difference between the vehicle position which is reached when one or more wheels impact against the obstacle and the end-of-parking position is smaller than or smaller than or equal to a threshold value.

5. The parking assist system as claimed in claim 3, wherein the threshold value for the degree of difference is a value in the range from 5 cm to 100 cm.

6. The parking assist system as claimed in claim 1, wherein the controller is further configured to calculate a degree of difference between the vehicle position, which is reached when the one or more wheels impact against the obstacle and the end-of-parking position.

7. The parking assist system as claimed in claim 1, wherein the controller is further configured to, as a result of both the first and second criteria being fulfilled, end the parking maneuver at the vehicle position which is reached when the one or more wheels impact against the obstacle.

8. The parking assist system as claimed in claim 3, wherein the controller is further configured to, as a result of both the first and second criteria being fulfilled, end the parking maneuver at the vehicle position which is reached when the one or more wheels impact against the obstacle.

9. The parking assist system as claimed in claim 1, wherein, the controller is further configured to, as a result of both the first and second criteria being fulfilled, reverse a direction of travel and move the motor vehicle a distance counter to the direction of travel, and only thereafter to end the parking maneuver.

10. The parking assist system as claimed in claim 3, wherein the controller is further configured to, as a result of both the first and second criteria being fulfilled, reverse a direction of travel and move the motor vehicle a distance counter to the direction of travel, and only thereafter to end the parking maneuver.

11. The parking assist system as claimed in claim 1, wherein the parking maneuver is a parking maneuver in a reverse direction, and the one or more wheels are rear wheels of the motor vehicle.

12. The parking assist system as claimed in claim 1, wherein the signal, which is characteristic of the drive torque of the drive engine, fulfills the first criterion when the signal is greater than or greater than or equal to a threshold value.

13. The parking assist system as claimed in claim 1, further comprising:
   a cruise controller configured to adjust the speed of the motor vehicle to a setpoint speed which is predefined by the parking assist system,
   wherein the cruise controller comprises an integrator for integrating a control error, and the signal which is characteristic of the drive torque of the drive engine is a signal at an output of the integrator or a signal which is dependent thereon.

14. The parking assist system as claimed in claim 1, wherein the controller is further configured to:
   detect that an actual speed of the vehicle is essentially zero, and
   check, in the event of the actual speed being essentially zero, whether the signal which is characteristic of the drive torque of the drive engine fulfills the first criterion.

15. The parking assist system as claimed in claim 1, wherein the delimiting ground obstacle which delimits the transverse parking space to the rear is a curbstone which delimits the parking space to the rear.

16. The parking assist system as claimed in claim 1, wherein the transverse parking space is delimited by a lateral object on one side of the transverse parking space and/or by another transverse object on the other side of the transverse parking space, and the controller is further configured to:

determine, before the parking maneuver is performed, an extent of the one object in a direction of the roadway and/or of an extent of the other object in the direction of the roadway using a sensor system, and define the end-of-parking position on the basis thereof.

17. A method for performing an automated parking maneuver of a motor vehicle into a transverse parking space transversely with respect to a roadway with automated longitudinal and transverse guidance along a parking trajectory, the method comprising the acts of:

defining an end-of-parking position for the motor vehicle corresponding to an assumed end of the parking maneuver, detecting, while the parking maneuver is being performed, that a signal which is characteristic of the drive torque of the drive engine fulfills a first criterion, the fulfillment of which indicates impacting of one or more wheels against an obstacle, detecting that the vehicle position reached when the one or more wheels impact against the obstacle fulfills, in comparison with the end-of-parking position, a second criterion, the fulfillment of which indicates that the obstacle is a delimiting ground obstacle which delimits the transverse parking space toward a rear, and ending the parking maneuver before the defined end-of-parking position is reached, as a result of both the first and second criteria being fulfilled.

* * * * *